United States Patent [19]

Straub et al.

[11] 4,201,287
[45] May 6, 1980

[54] DRAG CHAIN CONVEYOR

[75] Inventors: Paul Straub; Heinrich Jost, both of Oberuzwil, Switzerland

[73] Assignee: Gebrueder Buehler AG, Uzwil, Switzerland

[21] Appl. No.: 898,665

[22] Filed: Apr. 21, 1978

[30] Foreign Application Priority Data

Dec. 14, 1977 [CH] Switzerland .................. 15359/77

[51] Int. Cl.² .......................................... B65G 47/19
[52] U.S. Cl. .................................. 198/530; 198/359; 198/369; 222/559; 251/330
[58] Field of Search ............... 198/359, 369, 370, 530, 198/532; 214/18 PH, 35 R; 251/203, 330; 222/559, 560

[56] References Cited

U.S. PATENT DOCUMENTS

| 941,442 | 11/1909 | Dornfeld | 251/203 |
| 3,351,180 | 11/1967 | Herzog et al. | 198/370 |

FOREIGN PATENT DOCUMENTS

| 957993 | 11/1974 | Canada | 222/559 |
| 1454799 | 11/1976 | United Kingdom | 198/370 |

Primary Examiner—Jeffrey V. Nase
Attorney, Agent, or Firm—Merchant, Gould, Smith, Edell, Welter & Schmidt

[57] ABSTRACT

The invention concerns a drag chain conveyor with bulk material discharge openings that can be closed in a gas-tight fashion, with a slide plate, along with a slide box that is closed to the outside, and an actuation mechanism for opening and closing the slide plate, preferably via sidewardly arranged guides, and with a seal between the slide plate and the discharge opening.

3 Claims, 6 Drawing Figures

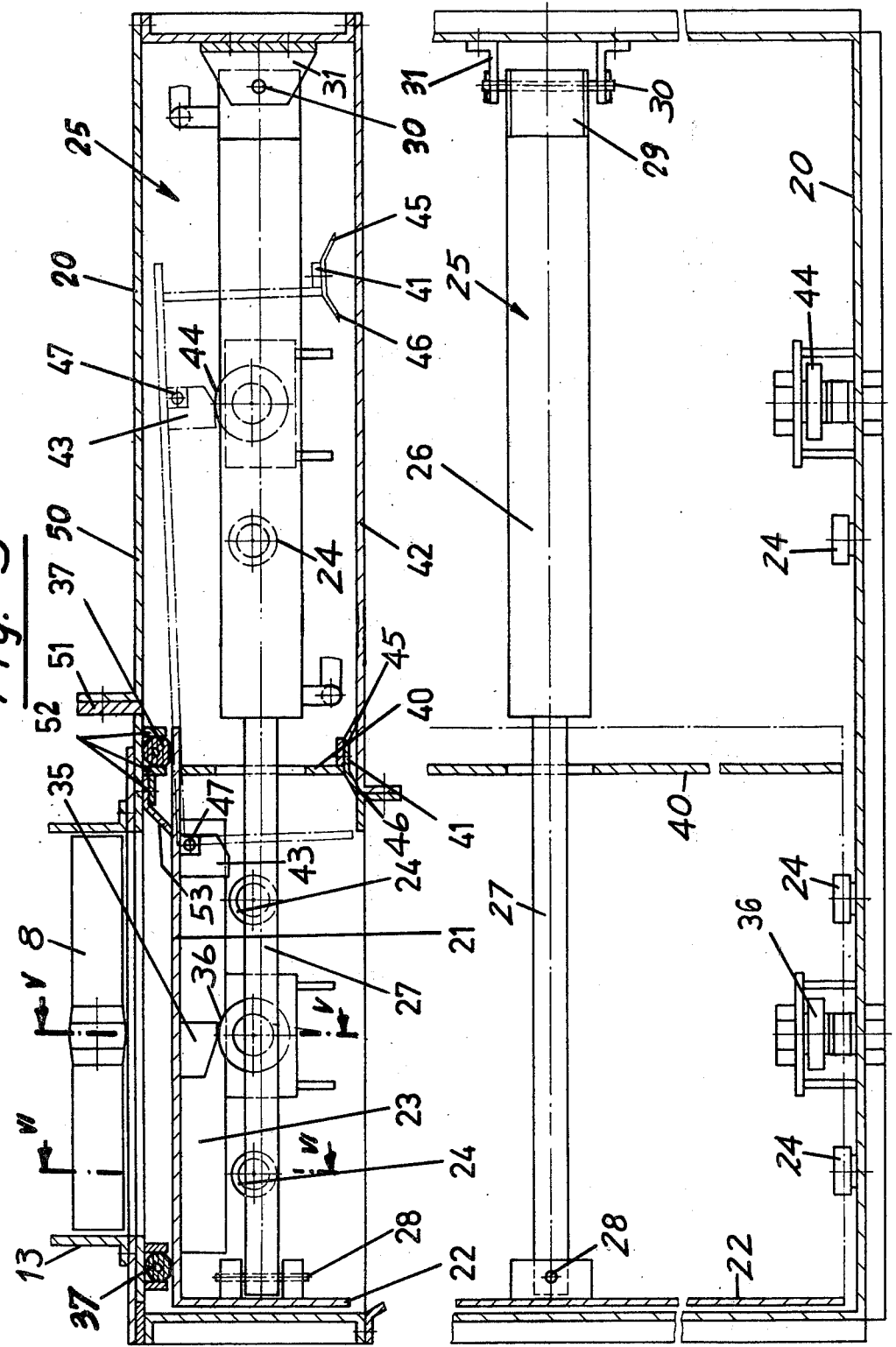

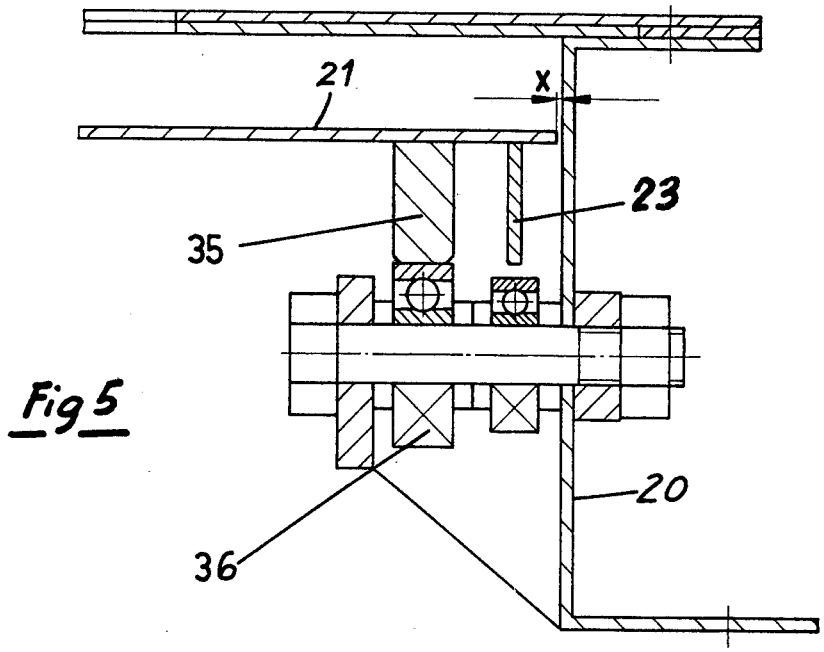
_Fig 5_
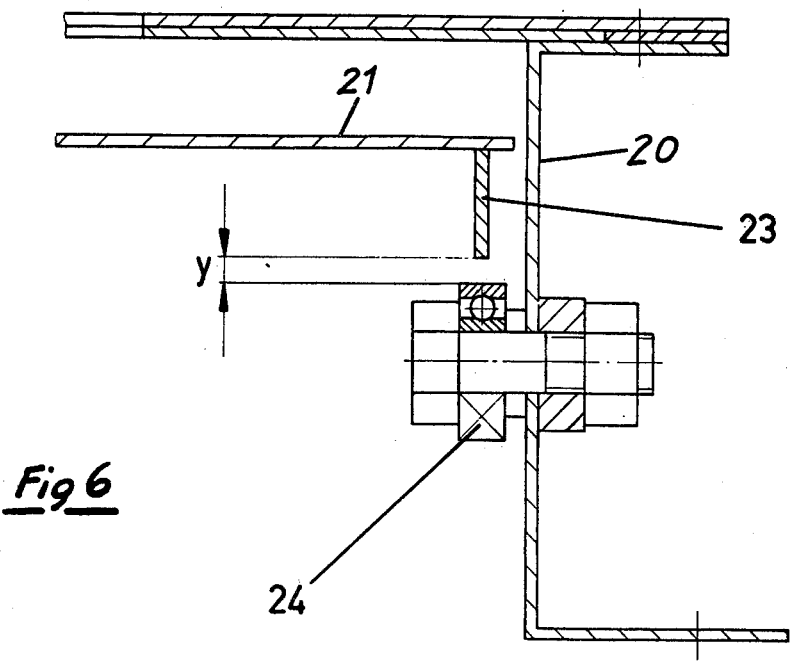
_Fig 6_

DRAG CHAIN CONVEYOR

BACKGROUND OF THE INVENTION

In recent times, conveyor elements are being increasingly associated to industrial process functions. For example, the task can consist in maintaining certain temperature relationships or conveying the bulk material under protective gas and under light gas pressure. Presently, the square cross section drag chain conveyor is being installed in an operationally safe fashion, for example, for temperatures from 250° C. and air pressures of up to 600 mm water column. It has, however, been shown that, with two or more outlets, for extreme installation conditions, known type closure contrivances are not completely satisfactory.

A difficulty with the mechanical transport of bulk materials is unsatisfactory ambient conditions, for example, temperature variations, moisture, and dust. Regarding extremely rough operations, the opinion is often expressed that the track switching operation for the flow of the bulk materials has to be carried out manually and be monitored. The operator can then assist when the switching operation and/or closure is jammed or otherwise interfered with, monitor functionally important parts such as seals and bearings, and remove collections of dirt in dead corners.

There are a known number of closure systems with refined mechanisms which, theoretically are said to guarantee ideal closure functions. In practice, however, there have been numerous contradicting experiences in which unforeseen influences and disturbances have occurred so that, ultimately, the specialist, particularly in cases of closures for drag chain conveyors, again desires the earlier, more simple closure slides.

Regarding slide operation, convincing arguments can be set forth for separation of the slide and sealing function. That is to say, if one dissociates actuation means of the two functions, carrying out of one or the other activity can be monitored or indicated.

Through carelessness, however, the actuation means for the sealing function is often forgotten, so that the more sophisticated embodiment can, in practice, be even less satisfactory than the more simple embodiment.

SUMMARY OF THE INVENTION

The goal of the invention is the construction of a closure system, specifically of a gas-tight slide of a type previously mentioned, that guarantees safe operation even under extreme ambient conditions.

The solution offered by the invention is characterized by a slide box open in the direction of the discharge opening which is blockable by means of the slide plate.

The slide plate is no longer guided in and out of the closure box as was previously done; the slide box no longer has a trap effect as it previously did, whereby dirt was able to accumulate therein.

The invention embodies a number of significantly more advantageous constructional ideas.

The slide plate is flexibly connected to the actuation means so that the slide plate can be made to press against the seal. Specifically, the slide plate is raised up from the guides shortly before reaching its fully extended position by two side wedge surfaces arranged approximately in the center of the sides of the slide plate so that the plate is raised and contacts the seal in a rocking fashion, and is pressed upwardly to form the gas-tight closure.

This measure has the significant advantage that the slide plate is not forcibly pressed into the sealing position via correspondingly directed guide surfaces, as is the case with previous solutions (Swiss Pat. No. 424,622). Now the plate is free to seek the best position during the important closure and/or sealing phase and yet has available for sealing, the closure force translated by the wedge surfaces.

The seal is advantageously constructed as an elastic hollow rubber profile so that the slide plate can somewhat compress the rubber. This has the advantage of forming an adequate seal when the slide plate executes only a simple wobbling motion transversely to the direction of the slide as directed by the side arrangement of wedge surfaces. It is evident that the wedge surfaces can also be structured in a resilient fashion in order to impart to the slide plate a wobbling motion in all directions. Alternatively, a single wedge surface could be arranged under the center of the slide plate. This simple wobbling motion has given satisfactory results.

It further, is very practical if the seal is formed as a sliding unit with a seal frame, and preferably removable transversely to the drag chain conveyor.

The slide plate itself can be structured as a cross slide, with the deck surface of the slide box being detachable so that seal frames, slide plates, etc., can be inserted and removed through the opening.

In further consideration of the invention, it can be observed that the embodiment can be refined if the seal frame projects a resilient wiper which abuts the slide plate.

Preferably, the slide plate is provided, on the forward side, with a downwardly inclined end cover that blocks the slide box when the slide is in the open position, so that dust cannot simply enter the slide box. More importantly, however, the flow of the bulk material will also be deflected by this end cover.

The back side of the slide plate likewise displays a downwardly inclined end cover to which is attached a resilient wiper abutting the slide box floor. Any dust infiltrating upon closure of the slide plate is thus thrust out of the slide box upon subsequent reextension of the slide plate. Any residual dust collected during the last phase of the slide plate retraction will be pushed out of the slide box during subsequent closure movements of the slide itself.

To effect this voiding, a contactor attached to the slide plate, shortly prior to the complete retraction, travels over a roller surface that raises up the wiper operating on the floor of the slide box, and the wiper is again set down on the floor plate at the fully retracted position. There is no elevating motion on extension of the slide plate.

BRIEF DESCRIPTION OF THE DRAWINGS

FIG. 3 shows the slide of FIG. 2 in larger scale;

FIG. 4 is a fragmentary plan view of the structure of FIG. 3;

FIG. 5 shows a cut along V—V of FIG. 3; and

FIG. 6 shows a cut along VI—VI of FIG. 3.

DETAILED DESCRIPTION

Figure 1:
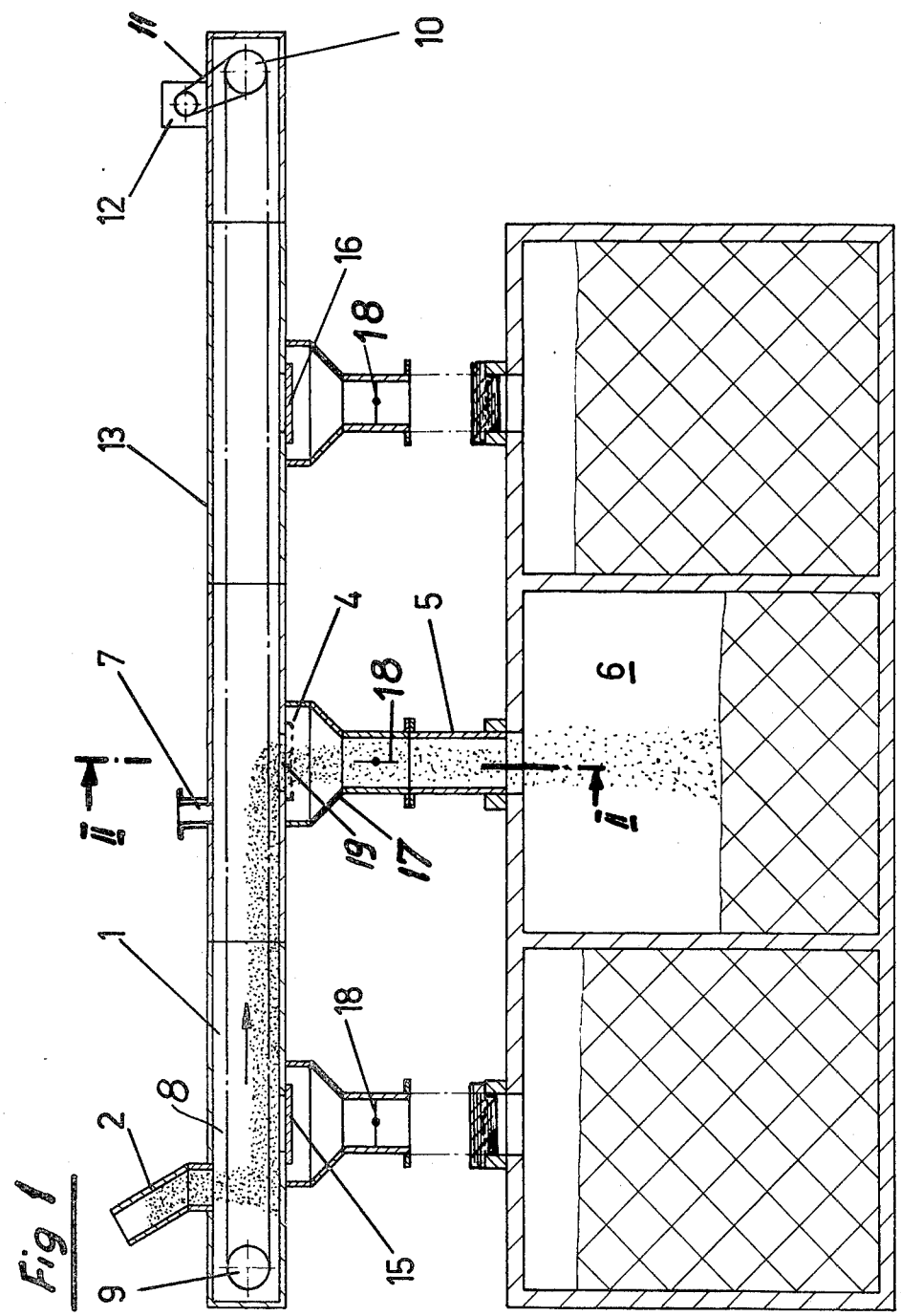
FIG. 1 shows schematically one arrangement of a drag chain conveyor having three discharge openings and slides for loading coke furnaces.
Figure 2:
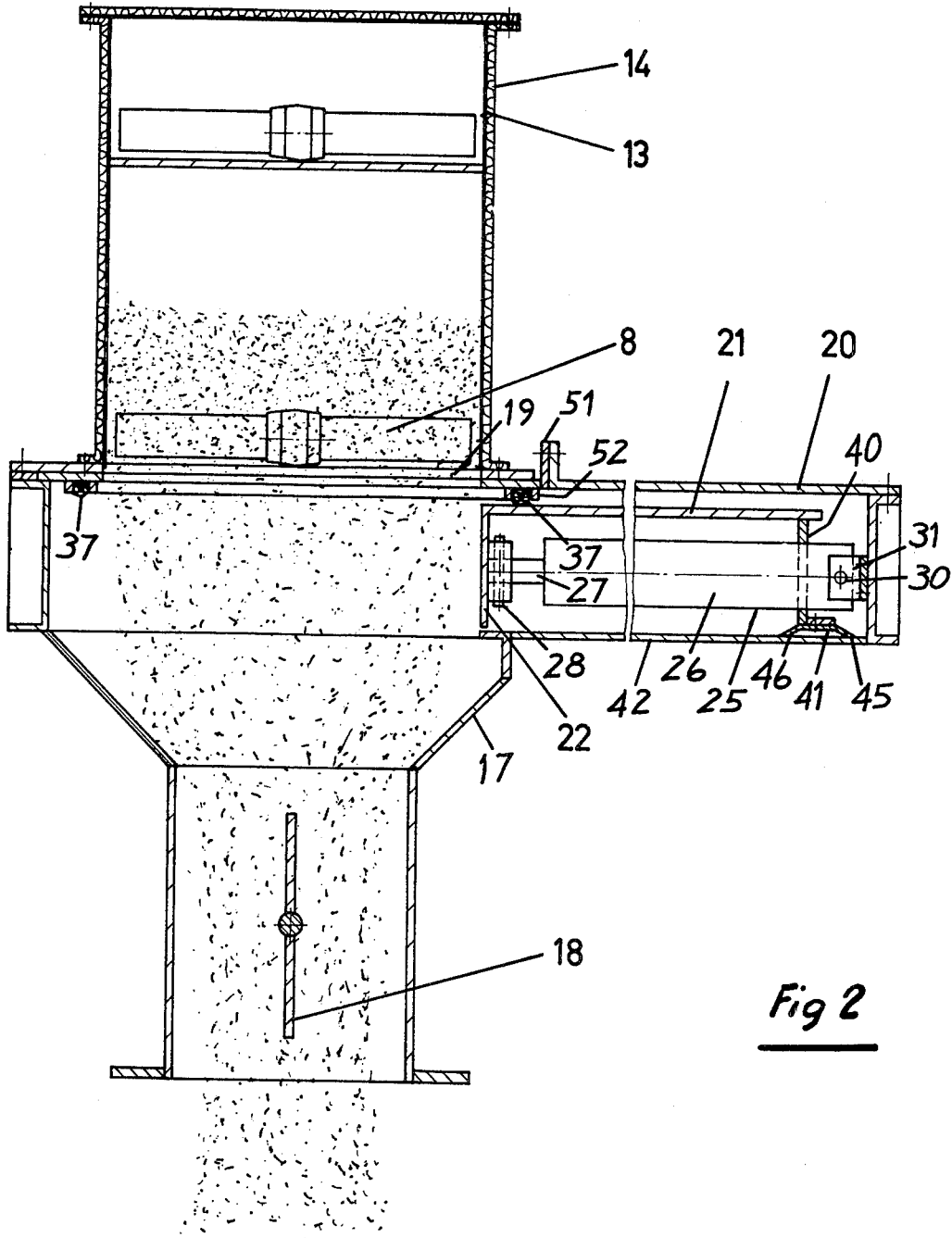
FIG. 2 is a cut along II—II of FIG. 1.

Reference will now be made to FIGS. 1 and 2. As mentioned, in the example, hot coal is transported to a drag chain conveyor 1 from a preparation installation that is not shown via an inlet stub 2, to an open slide 4, and fed, via discharge housing means including a downwardly extending pipe 5, mounted under the conveyor floor around the discharge opening 19, into the furnace chamber 6 that is to be filled. In doing this, the coal temperature can reach up to 250° C. To prevent the coal from starting to burn, a protective gas under pressure is injected in the drag chain conveyor 1 via a stub 7, and gas pressures of over 500 mm water column can be attained therein.

Conveying the coal occurs in a known manner, in that the conveyor chain 8 draws the coal, rug-fashion, on the floor of the conveyor trough up to a free bulk material discharge opening. The conveyor chain 8 is led over a guide roller 9 and a drive roller 10, driven via a chain 11 by a drive motor 12. The drag chain conveyor is closed off air-tight on all sides through means of a housing 13 and is additionally protected by an insulation 14.

The dual function of a closure and a slide for drag chain conveyors can easily be recognized from FIG. 1. The first slide 15 is closed. It must, on the one hand, prevent gases from escaping from below toward the top, and additionally must prevent protective gas from escaping downwardly out of the chain transport. Simultaneously, the slide is also the conveyor floor at that point, since the coal is pulled over the slide by the conveyor chain 8. On the other hand, slide 16, in the arrangement shown, has only a purely sealing function. Slide 16 must be closed, as is slide 15.

In order not to allow heat to escape unnecessarily toward the top, protective dampers 18 can be arranged in the drain gutter 17. During operation, the down-pipe being utilized cannot be changed from one to another, and the unused openings in the coke furnace must also be closed.

The discharge housing means has an aperture in a side wall thereof, over which a sealed slide box 20 is mounted outside the housing. Slide box 20 is shown in a longitudinal cut in FIG. 2. The slide box is closed off to the outside on all sides in an air-tight fashion.

A slide plate 21 is mounted in the slide box 20. Slide plate 21 has a first generally horizontally extending flat panel-like portion adapted to seal discharge opening 19 in a first position thereof within the discharge housing means, and a second generally vertically extending panel-like portion 22 adapted to close the aperture in the discharge housing means when the slide plate 21 is moved to a second position thereof within the slide box 20.

In FIG. 3, the generally L-shaped slide plate 21 is illustrated in the closed and sealed position. At each side, slide plate 21 has two trays in the nature of downwardly depending runners 23 that slide on guides or rollers 24, which are structured here as a number of ball bearings.

The actuation means 25 for movement of the slide can be of any type, e.g. electric motor shaft, pneumatic actuator or chain drive. Illustrated in FIG. 3 is a hydraulic actuator 26 whose piston rod 27 is connected with slide plate 21 via a perpendicular joint pin 28.

The head 29 of hydraulic actuator 26 is linked to the closed end of the slide box 20 opposite the aperture via a horizontally lying joint pin 30 and a bracket 31.

The actuation means 25 is adapted to selectively move the slide plate 21 either to the first position beneath the discharge opening 19 to block the flow of bulk material through the discharge opening, or to the second position in the slide box 20 to permit discharge through the opening 19 while sealing the aperture in the side wall of the discharge housing means.

The piston rod is attached with considerable play relative to joint pin 28.

Since the slide plate is preferably installed in a horizontal position, it normally lies down, by its own weight, on guides 24 and can easily be drawn back and forth over the ball bearings.

Approximately in the lateral center of the slide plate, there are attached two wedge surfaces 35 which runs over a "track supporting roller" 36. As can be seen in FIGS. 5 and 6, tray 23, in the closed slide position, is lifted up off the guide 24 and the ball bearing by an amount of play "Y" and is pressed upwardly against a flexible seal member 37 by the track supporting roller 36. Seal means 37 is mounted under the conveyor floor around the discharge opening 19, encircling completely all four sides of the opening.

By the above described transfer of the closure force created by wedge surface 35 riding up track supporting roller 36, the slide plate can be raised up off the guides 24 in order to impart a closure motion. Depending upon the special conditions and, in particular, the dimensions of the slide plate, a closure motion in the area of e.g. 5–10 mm, or in special cases even above this, e.g. up to 50 mm, can be obtained. A greater amount of raising up of the slide plate 21 off the guides 24 is always necessary if the slide plate 21 is to be aligned flush with the conveyor trough floor in the closed position.

The simultaneous sliding the closure motion also has the advantage that the slide plate wipes off loose material residues near seal 37, made in the form of a hollow rubber profile, that tubular seal 37 is stressed uniformly initially, and the slide plate is pressed uniformly over the entire sealing surface in the sealed position. A resilient wiper 53 projects downwardly from the frame 52 of seal 37 to engage slide plate 21 and further enhance wiping action of seal 37 during retraction of slide plate 21.

Slide plate 21, further, projects on the back side a downwardly directed end cover 40, bearing on the bottom edge a wiper 41 that rests resiliently on floor or lower wall 42 of slide box 20. Attached to the slide plate in the area below the rear terminal side is a pivotally mounted contactor or second wedge means 43, which, when drawn over roller 44, raises the back end of the slide plate. The same motion is also applied to wiper 41 so that the dust residue pushed back by the rearwardly directed edge 45 remains on the slide box floor 42 as the wiper hops over, and, after lowering of the slide plate, it is pushed out of the slide box and into the gutter 17 by forwardly directed edge 46 during subsequent extension of the slide plate. Long term tests have shown that the rear dead space of the slide box does in fact, resultantly, remain free of dust even in extreme cases as a result of this automatic voiding. The contactor 43 is structured such that it raises the slide plate 21 on its way to retraction. However, on its way to extension, it turns about an axis 47 so that the slide plate remains down. The top side of the slide box is closed in an air-tight fashion by a detachable cover. All internal parts of the slide can be inserted and removed through the opening.

This also applies to seal 37 which, together with a frame 52 can, as a unit, be pulled rearwardly beneath seal plate 51 and taken out through the opening.

What is claimed is:

1. Drag chain conveyor apparatus, comprising
   (a) a conveyor having a floor with at least one bulk material discharge opening therein,
   (b) discharge housing means, including a downwardly extending pipe, mounted under said floor, around said discharge opening,
   (c) said discharge housing means having an aperture in a side wall thereof,
   (d) a sealed slide box mounted outside said discharge housing means on said side wall thereof, over said aperture,
   (e) a slide plate having a first generally horizontally extending portion adapted to seal said discharge opening in a first position thereof, and a second generally vertically extending portion thereof, and
   (f) means for selectively moving said slide plate either to said first position beneath said discharge opening to block the flow of bulk material through said discharge opening, or to said second position in said slide box to permit discharge through said opening while sealing said aperture;

wherein said slide plate is a generally L-shaped member having said second portion at one end thereof, wherein a downwardly directed end cover is mounted near an opposite end thereof, and wherein a resilient wiper is mounted on a bottom edge of said end cover to engage a lower wall of said slide box during movement of said slide plate toward said first position.

2. The apparatus of claim 1 wherein means are mounted on said slide plate and slide box which cooperate to raise said resilient wiper up off said lower wall for a short distance during movement of said slide plate to said second position, but permits said resilient wiper to maintain contact with said lower wall during movement of said slide plate from said second position to said first position, whereby dirt collected in said slide box is wiped out each time said slide plate is moved to the first position.

3. Apparatus according to claim 2 wherein said last named means comprise roller means in said slide box and second wedge means mounted on said slide plate, said second wedge means being pivotally mounted on said slide plate so as to cooperate with the roller means to lift the slide plate during movement in one direction, but pivots out of the way during movement in the other direction.

* * * * *